(12) United States Patent
Sun et al.

(10) Patent No.: US 12,545,065 B2
(45) Date of Patent: Feb. 10, 2026

(54) SENSOR BRACKET AND VEHICLE

(71) Applicant: Beijing Tusen Zhitu Technology Co., Ltd., Beijing (CN)

(72) Inventors: Ming Sun, Beijing (CN); Haifeng Wang, Beijing (CN); Bo Wen, Beijing (CN); Yajia Wang, Beijing (CN); Xiaolei Yuan, Beijing (CN); Ruifang Jia, Beijing (CN)

(73) Assignee: Beijing OCGen Technology Co., Ltd., Beijing (CN)

( * ) Notice: Subject to any disclaimer, the term of this patent is extended or adjusted under 35 U.S.C. 154(b) by 818 days.

(21) Appl. No.: 17/805,105

(22) Filed: Jun. 2, 2022

(65) Prior Publication Data

US 2022/0388358 A1 Dec. 8, 2022

(30) Foreign Application Priority Data

Jun. 2, 2021 (CN) .......................... 202110611903.3

(51) Int. Cl.
*B60D 1/62* (2006.01)
*G01S 7/481* (2006.01)
*G01S 17/931* (2020.01)

(52) U.S. Cl.
CPC .............. *B60D 1/62* (2013.01); *G01S 7/4813* (2013.01); *G01S 17/931* (2020.01); *B60Y 2200/145* (2013.01)

(58) Field of Classification Search
CPC ...... G01S 17/931; G01S 17/88; G01S 7/4808; G01S 2013/93272; G01S 7/4813;
(Continued)

(56) References Cited

U.S. PATENT DOCUMENTS 6,809,806 B1\* 10/2004 Carnevale ............. G01S 7/4026
356/138
2019/0235519 A1 8/2019 Carter et al.
2019/0360552 A1\* 11/2019 Henry ..................... G01S 13/88

FOREIGN PATENT DOCUMENTS

CN 203188105 U 9/2013
CN 206684292 U \* 11/2017
(Continued)

OTHER PUBLICATIONS

European Patent Office, Communication pursuant to Article 94(3) EPC for EP Appl. No. 22175619.0, mailed on May 2, 2024, 6 pages.
(Continued)

*Primary Examiner* — Valentin Neacsu
*Assistant Examiner* — Morgan Knauf
(74) *Attorney, Agent, or Firm* — Perkins Coie LLP

(57) ABSTRACT

The present document describes a sensor bracket and a vehicle, the sensor bracket comprising: a first cross beam, the first side thereof being mounted to the frame cross beam of a tail portion of a tractor; at least two vertical beams perpendicularly mounted to the first cross beam; and a second cross beam located below the first cross beam and connecting at least two vertical beams; wherein each of the vertical beams has a first sliding groove and the second cross beam is operable to slide up and down along the first sliding grooves. The sensor bracket of the present application has a simple structure and stable performance, and adopts the frame cross beam of the original vehicle for mounting, making it easy to operate, easy to replace, and easy to adjust.

10 Claims, 4 Drawing Sheets

(58) Field of Classification Search
CPC .. B60D 1/62; B60D 1/36; B60R 11/04; B62D 53/00; B60Y 2200/145
USPC .......................................................... 280/400
See application file for complete search history.

(56) References Cited

FOREIGN PATENT DOCUMENTS

| | | | | |
|---|---|---|---|---|
| CN | 206781652 U | | 12/2017 | |
| CN | 207931620 U | * | 10/2018 | |
| CN | 207992435 U | * | 10/2018 | |
| CN | 108761481 A | * | 11/2018 | ............. G01B 11/26 |
| CN | 111169389 A | * | 5/2020 | ............. B60R 11/00 |
| CN | 111288930 A | | 6/2020 | |
| CN | 111366938 A | | 7/2020 | |
| CN | 113432553 A | | 9/2021 | |
| CN | 211943155 U | | 11/2022 | |
| EP | 3438776 A1 | | 2/2019 | |
| JP | 2001334966 A | | 12/2001 | |
| WO | 2019231473 A1 | | 12/2019 | |
| WO | 2020103354 A1 | | 5/2020 | |

OTHER PUBLICATIONS

European Patent Office, Extended European Search Report for EP 22175619.0, Mailing Date: Nov. 8, 2022, (10 pages).

Roberts, James, "Will Autonomous Trucks Help the Industry Become Environmentally Friendly?", https://biofriendlyplanet.com/eco-awareness/air-quality/emissions/will-autonomous-trucks-help-the-industry-become-environmentally-friendly/, accessed Oct. 27, 2022.

Stahn, Roland, "Laser Scanner-Based Navigation and Motion Planning for Truck-Trailer Combinations", IEEE Xplore, 1-4244-1264-1/07, 2007.

Notice of Decision in corresponding related Chinese Patent Application No. 202110611903.3, dated Oct. 28, 2025.

* cited by examiner

SENSOR BRACKET AND VEHICLE

CROSS-REFERENCE TO RELATED APPLICATION(S)

The present disclosure claims priority to Chinese Patent Application No. 202110611903.3, titled "SENSOR BRACKET AND VEHICLE", filed on Jun. 2, 2021, the content of which is incorporated herein by reference in its entirety.

TECHNICAL FIELD

The present disclosure relates to the technical field of vehicle equipment, and more particularly to a sensor bracket and a vehicle.

BACKGROUND

A semi-trailer is a heavy-duty transportation vehicle that connects a tractor with a trailer through a traction pin. Compared with a monocoque truck, the semi-trailer can improve the comprehensive economic benefits of highway transportation. With the development of the automatic driving technology, the trailing angle (trailing angle comprising the included angle between the tractor and the trailer) as a basis of automatic driving planning and control has become the focus of research. Detection of trailing angle without significantly changing the original vehicle structure becomes an urgent technical problem to be solved.

SUMMARY

Embodiments of the present disclosure provide a sensor bracket to address or at least address the above-mentioned problems, and in some embodiments, the sensor bracket enables stable mounting of one or more light detection and ranging (LiDAR) sensors or devices on the vehicle to detect trailing angle.

According to one aspect of an embodiment of the present disclosure, there is provided a sensor bracket comprising: a first cross beam, the first side of which is mounted to the frame cross beam of the tail portion of a tractor; at least two vertical beams being perpendicularly mounted to the first cross beam; and a second cross beam located below the first cross beam and connecting the at least two vertical beams; wherein each of the vertical beams has a first sliding groove and the second cross beam is operable to slide up and down along the first sliding grooves.

According to one aspect of an embodiment of the present disclosure, there is provided a vehicle comprising a tractor and a trailer, a tail portion of the tractor having a frame cross beam, and a sensor bracket mounted to the frame cross beam, the sensor bracket comprising: a first cross beam mounted to the frame cross beam; at least two vertical beams being perpendicularly mounted to the first cross beam; and a second cross beam located below the first cross beam and connecting the at least two vertical beams; wherein each of the vertical beam a first sliding groove and the second cross beam is operable to slide up and down along the first sliding grooves.

The technical solution provided by the present disclosure can mount a variety of sensors, such as a single-line LiDAR sensor and a multi-line LiDAR sensor. At the same time, the overall performance is stable. The mounting point adopts the frame cross beam of the original vehicle, with a simple and stable structure and convenient mounting. In addition, a sliding groove is provided on the vertical beam of the bracket, and a sliding groove can also be provided on the cross beam of the bracket, so as to facilitate the adjustment of the upper, lower, left, and right heights of each sensor, and improve the accuracy of the trailing angle (comprising the included angle between the axle wire of the tractor and the axle wire of the trailer, or comprising the included angle between the orientation of the tractor and the orientation of the trailer) detection and the blind spot detection.

BRIEF DESCRIPTION OF THE DRAWINGS

In order to explain the technical solutions of embodiments of the present disclosure more clearly, the following will briefly introduce the drawings that need to be used in the description of the embodiments of the present disclosure. Obviously, the drawings in the following description are merely some embodiments of the present disclosure. For those of ordinary skills in the art, other drawings can be obtained based on these drawings without creative efforts.

DETAILED DESCRIPTION

Figure 1:
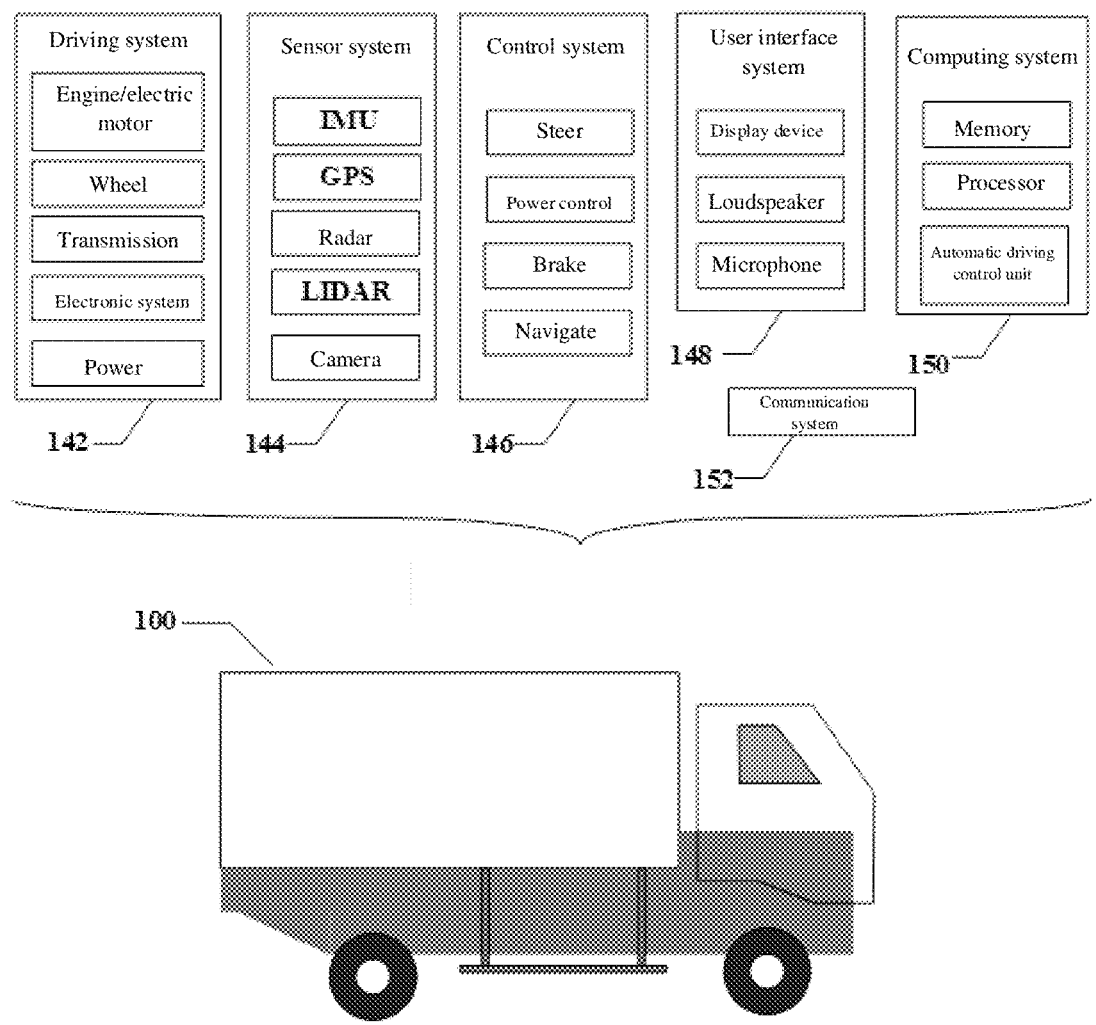
FIG. 1 is a schematic view of a three-dimensional structure of a vehicle 100 according to an embodiment of the present disclosure.

Example embodiments of the present invention will be described in further detail below with reference to the accompanying drawings and embodiments. The following detailed description of the embodiments and the accompanying drawings are provided to exemplarily illustrate the principles of the present invention and are not intended to limit the scope of the invention, i.e. the invention is not limited to the embodiments described.

In the description of the present invention, it needs to be noted that, unless otherwise stated, the terms "first", "second", etc. are only used for the purpose of description, and should not be construed as indicating or implying the relative importance; the meaning of "multiple" is two or more; the orientational or positional relationship indicated by the terms "inner", "outer", "top", "bottom", etc. is based on the orientation or positional relationship shown in the drawings, and is only for the convenience of describing the present invention and simplifying the description, rather than indicating or implying that the indicated device or element must have a particular orientation, be constructed and operated in a particular orientation, and therefore should not be construed as a limitation of the present invention.

The sensor bracket provided by embodiments of the present application is mounted on a vehicle, and the vehicle 100 involved in the present application will be described below with reference to FIG. 1. FIG. 1 is a schematic view of a vehicle 100 in which various techniques disclosed herein may be implemented. The vehicle 100 may be a car, a truck, a motorcycle, a bus, a ship, an airplane, a helicopter, a lawn mower, an excavator, a snowmobile, an aircraft, a traveling and recreational vehicle, an amusement park vehicle, a farm device, a construction device, a tramcar, a golf cart, a train, a trolleybus, or other vehicles. The vehicle 100 may run fully or partially in an automatic driving mode.

The vehicle 100 may control itself in the automatic driving mode. For example, the vehicle 100 may determine the current state of the vehicle and the current state of an environment in which the vehicle is located, determine a predicted behavior of at least one other vehicle in the environment, determine a trust level corresponding to a possibility that the at least one other vehicle will perform the predicted behavior, and control the vehicle 100 itself based on the determined information. While in the automatic driving mode, the vehicle 100 may run without human interaction.

The vehicle 100 may comprise various vehicle systems such as a driving system 142, a sensor system 144, a control system 146, a user interface system 148, a computing system 150, and a communication system 152. The vehicle 100 may comprise more or fewer systems, each of which may comprise multiple units. Further, each system and unit of the vehicle 100 may be interconnected. For example, the computing system 150 can be in data communication with one or more of the driving system 142, sensor system 144, control system 146, user interface system 148, and communication system 152. Therefore, one or more of the described functions of the vehicle 100 may be divided into additional functional components or entity components, or combined into a smaller number of functional components or entity components. In a further example, an additional functional component or entity component may be added to the example shown in FIG. 1. The driving system 142 may comprise multiple operable components (or units) that provide kinetic energy to the vehicle 100. In one embodiment, the driving system 142 may comprise an engine or an electric motor, a wheel, a transmission, an electronic system, and a power (or a power source). The engine or electric motor may be any combination of the following devices: internal combustion engines, electric motors, steam engines, fuel cell engines, propane engines, or other forms of engines or electric motors. In some embodiments, the engine can convert a power source to mechanical energy. In some embodiments, the driving system 142 may comprise multiple engines or electric motors. For example, a gasoline-electric hybrid vehicle may comprise a gasoline engine and an electric motor, and other situations may also be included.

The wheel of the vehicle 100 may be a standard wheel. The wheel of the vehicle 100 may be a wheel in a variety of forms, comprising one-wheeled, two-wheeled, three-wheeled, or four-wheeled forms, such as four wheels of a car or a truck. Other numbers of the wheels are possible, such as six-wheel or more wheels. One or more wheels of the vehicle 100 may be operated to rotate in a different direction from the other wheels. The wheel may be at least one wheel fixedly connected to the transmission. The wheel may comprise a combination of metal and rubber, or a combination of other substances. The transmission may comprise a unit operable to transfer the mechanical power of the engine to the wheel. For this purpose, the transmission may comprise a gearbox, a clutch, a differential gear, and a drive shaft. The transmission may also comprise other units. The drive shaft may comprise one or more axles that match with the wheel. The electronic system may comprise a unit for transmitting or controlling an electronic signal of the vehicle 100. These electronic signals may be configured to initiate multiple lights, multiple servos, multiple electric motors, and other electronic driving or control devices in the vehicle 100. The power source may be an energy source that provides, in whole or in part, power for an engine or electric motor. That is, the engine or electric motor can convert the power source into mechanical energy. Illustratively, the power sources may comprise gasoline, petroleum, petroleum-type fuels, propane, other compressed gaseous fuels, ethanol, fuel cells, solar panels, batteries, and other electrical energy sources. The power source may additionally or alternatively comprise any combination of a fuel tank, a battery, a capacitance, or a flywheel. The power source may also provide power to other systems of the vehicle 100.

The sensor system 144 may comprise multiple sensors for sensing information about the environment and conditions of the vehicle 100. For example, the sensor system 144 may comprise an inertial measurement unit (IMU), a GNSS (global navigation satellite system) transceiver (e.g. a global positioning system (GPS) transceiver), a radar (RADAR), a laser diastimeter/LIDAR (or other distance measurement devices), an acoustic sensor, an ultrasonic sensor, and a camera or an image capturing device. The sensor system 144 may comprise multiple sensors (e.g. oxygen ($O_2$) monitor, a fuel gauge sensor, an engine oil pressure sensor, and a temperature sensor, a humidity sensor, a pressure sensor, etc.) for monitoring the vehicle 100. Other sensors may also be configured. One or more sensors included in the sensor system 144 may be driven individually or collectively to update the position, the orientation, or both the position and the orientation of one or more sensors.

The IMU may comprise a combination of sensors (e.g. an accelerator and a gyroscope) for sensing position and orientation changes of the vehicle 100 based on inertial acceleration. The GPS transceiver may be any sensor configured to estimate the geographic location of the vehicle 100. For this purpose, the GPS transceiver may comprise a receiver/transmitter to provide the location information of the vehicle 100 relative to the earth. It needs to be noted that GPS is an example of a global navigation satellite system. Therefore, in some embodiments, the GPS transceiver may be replaced with a BeiDou Navigation Satellite System transceiver or a Galileo satellite navigation system transceiver. The radar unit may use radio signals to sense an object in the environment in which the vehicle 100 is located. In some embodiments, in addition to sensing objects, the radar unit may be configured to sense the speed and heading direction of an object approaching the vehicle 100. The laser diastimeter or LIDAR unit (or other distance measuring devices) may be any sensor that uses a laser to sense an object in the environment in which the vehicle 100 is located. In one embodiment, a laser diastimeter/LIDAR unit may comprise a laser source, a laser scanner, and a detector. The laser diastimeter/LIDAR unit is configured to work in either a continuous (e.g. using heterodyne detection) or discontinuous detection mode. The camera may comprise a device for capturing multiple images of the environment in which the vehicle 100 is located. The camera can be a still image camera or a dynamic video camera.

The control system 146 is configured to control the operation of the vehicle 100 and components (or units) thereof. Accordingly, the control system 146 may comprise various units, such as a steering unit, a power control unit, a braking unit, and a navigation unit.

The steering unit may be a combination of machines that adjust the heading direction of the vehicle 100. The power control unit (which may be, for example, a throttle), for example, may be configured to control the operating speed of the engine and thus the speed of the vehicle 100. The brake unit may comprise a combination of machines for decelerating the vehicle 100. The brake unit may decelerate the vehicle in a standard manner by using a frictional force. In other embodiments, the braking unit may convert the kinetic energy of the wheel into an electrical current. The brake unit may also take other forms. The navigation unit may be any system that determines a driving path or route for the vehicle 100. The navigation unit may also dynamically update the driving path during the traveling of the vehicle 100. The control system 146 may additionally or alternatively, comprise other components (or units) not shown or described.

The user interface system 148 may be configured to allow the interaction between the vehicle 100 and an external sensor, other vehicles, other computer systems, and/or a user of the vehicle 100. For example, the user interface system 148 may comprise a standard visual display device (e.g. a plasma display, a liquid crystal display (LCD), a touch screen display, a head-mounted display, or other similar displays), a loudspeaker, or other audio output devices, a microphone or other audio input device. For example, the user interface system 148 may also comprise a navigation interface and an interface that controls the internal environment (e.g. temperature, fans, etc.) of the vehicle 100.

The communication system 152 may provide a way for the vehicle 100 to communicate with one or more equipment or other vehicles around. In one exemplary embodiment, the communication system 152 may communicate with one or more equipment directly or through a communication network. The communication system 152 may be, for example, a wireless communication system. For example, the communication system may use 3G cellular communication (e.g. CDMA, EVDO, GSM/GPRS) or 4G cellular communication (e.g. WiMAX or LTE), as well as 5G cellular communication. Alternatively, the communication system may communicate (e.g. using WIFI®) with a wireless local area network (WLAN). In some embodiments, the communication system 152 may communicate directly with one or more equipment or other vehicles around, for example, using infrared, Bluetooth®, or ZIGBEE. Other wireless protocols, such as various vehicle-mounted communication systems, are also within the scope disclosed by the present application. For example, the communication system may comprise one or more dedicated short-range communication (DSRC) devices, V2V devices, or V2X devices that conduct data communication publicly or privately with a vehicle and/or a roadside station.

The computing system 150 can control some or all of the functions of the vehicle 100. The automatic driving control unit in the computing system 150 can be configured to identify, evaluate, and avoid or cross potential obstacles in the environment in which vehicle 100 is located. In general, the automatic driving control unit may be configured to control the vehicle 100 without a driver, or to provide assistance for a driver to control the vehicle. In some embodiments, the automatic driving control unit is configured to combine data from the GPS transceiver, radar data, LIDAR data, camera data, and data from other vehicle systems to determine the advancing path or trajectory of the vehicle 100. The automatic driving control unit may be activated to enable the vehicle 100 to be driven in an automatic driving mode.

The computing system 150 may comprise at least one processor (which may comprise at least one microprocessor) that executes a processing instruction (i.e. machine-executable instruction) stored in a non-volatile computer-readable medium (e.g. a data storage device or a memory). The computing system 150 may also be multiple computing devices that distributedly control the component or system of the vehicle 100. In some embodiments, the memory may contain a processing instruction (e.g. program logic) that is executed by the processor to implement various functions of the vehicle 100. In one embodiment, the computing system 150 is capable of data communication with the driving system 142, sensor system 144, control system 146, user interface system 148, and/or communication system 152. The interface in the computing system is configured to facilitate data communication between the computing system 150 and the driving system 142, sensor system 144, control system 146, user interface system 148, and communication system 152.

The memory may also comprise other instructions, comprising instructions for data transmitting, instructions for data receiving, instructions for interaction, or instructions for controlling the driving system 142, sensor system 144, or control system 146 or user interface system 148.

In addition to the storage processing instruction, the memory may store a variety of information or data, such as image processing parameters, road maps, and route information. The information may be used by the vehicle 100 and the computing system 150 during the running of the vehicle 100 in an automatic, semi-automatic, and/or manual mode.

Although the automatic driving control unit is shown separate from the processor and memory, it should be understood that in some embodiments, some or all of functions of the automatic driving control unit may be implemented using a program code instruction residing in one or more memories (or data storage devices) and executed by one or more processors. The automatic driving control unit can be implemented using the same processor and/or memory (or data storage device) in some cases. In some embodiments, the automatic driving control unit may be implemented at least in part using various dedicated circuit logics, various processors, various field programmable gate arrays ("FPGA"), various application specific integrated circuits ("ASIC"), and various real-time controllers and hardware.

The computing system 150 may control the function of the vehicle 100 according to inputs received from various vehicle systems (e.g. driving system 142, sensor system 144, and control system 146) or inputs received from the user interface system 148. For example, the computing system 150 may use input from the control system 146 to control a steering unit to avoid an obstacle detected by the sensor system 144. In one embodiment, the computing system 150 may be configured to control multiple aspects of the vehicle 100 and the system thereof.

Although various components (or units) integrated into the vehicle 100 are shown in FIG. 1, one or more of these components (or units) may be carried by the vehicle 100 or individually associated with the vehicle 100. For example, the computing system can exist partially or completely independently from the vehicle 100. Therefore, the vehicle 100 can exist as a separate or integrated equipment unit. The equipment units constituting the vehicle 100 may communicate with each other via wired communication or wireless communication. In some embodiments, additional components or units may be added to each system or one or more than one components or units (e.g. LiDAR or radar shown in FIG. 1) may be removed from the system.

As stated above, the detection of a trailing angle of an automatic driving truck is a technical problem to be solved urgently in the field. At present, when the detection is carried out via a LiDAR sensor, the LiDAR sensor is mounted directly the original truck, and the LiDAR sensor cannot be adjusted, resulting in that the LiDAR sensor is mounted too high and does not match the height of the reflecting plate at the trailer so that in some bumpy road sections, the LiDAR sensor cannot collect point cloud data on the reflecting plate.

To this end, the present disclosure provides a sensor bracket capable of mounting one or more sensors at the same time, enabling the free adjustment of the position of the sensors.

Figure 2:
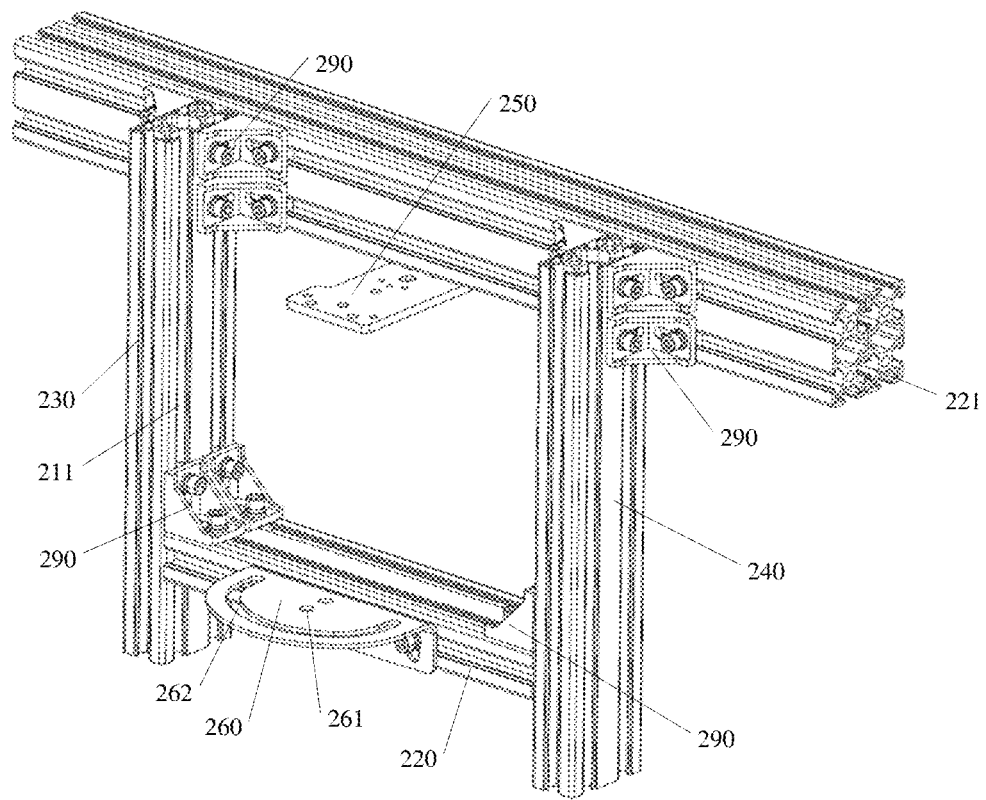
FIG. 2 is a schematic structural view of a sensor bracket 200 according to an embodiment of the present disclosure.
Figure 3:
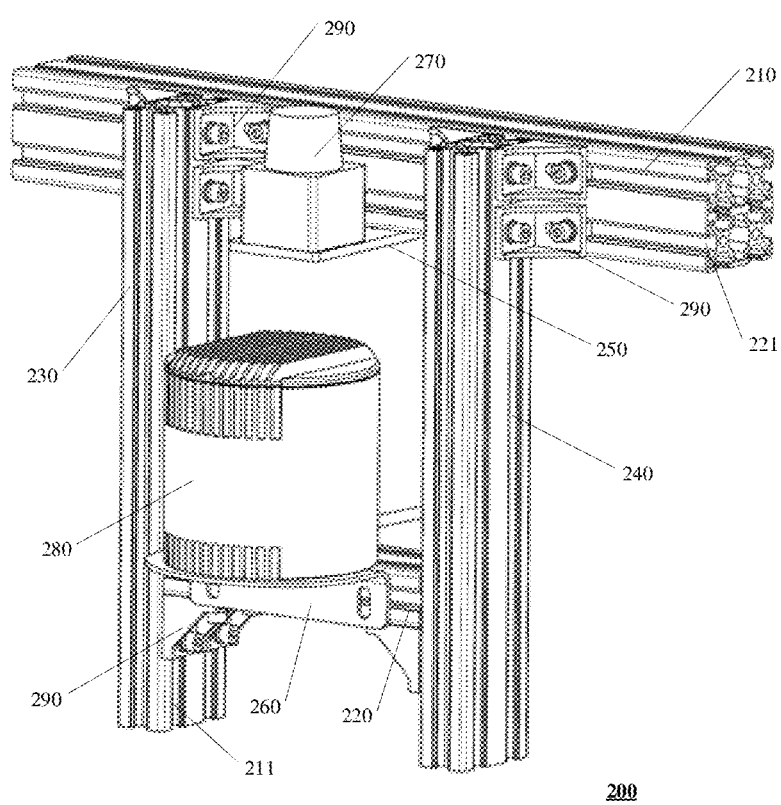
FIG. 3 is a schematic structural view of a sensor bracket 200 according to another embodiment of the present disclosure.

FIG. 2 is a schematic structural view of a sensor bracket 200 according to one embodiment of the present disclosure. FIG. 3 shows a structure view of a sensor bracket 200 that may be mounted with one or more LiDAR sensors. Referring to FIGS. 2 and 3, the sensor bracket 200 comprises a first cross beam 210, a second cross beam 220, and at least two vertical beams. At least two vertical beams, for example, comprise a first vertical beam 230 and a second vertical beam 240. Of course, those skilled in the art can set other vertical beams as required, which is not limited in the present disclosure.

The first side of the first cross beam 210 is mounted on the frame cross beam (which may be referred to as the first frame cross beam for ease of distinction) of the tractor tail portion, the first side being understood as the side facing away from the paper, i.e. the back side of the first cross beam 210 is mounted on the first frame cross beam.

The first vertical beam 230 and the second vertical beam 240 are vertically mounted on the first cross beam 210. In some embodiments, two vertical beams are mounted perpendicularly to the second side of the first cross beam 210, the second side being understood as the side facing the paper, i.e. the front plane, i.e. two vertical beams are mounted to the front plane of the first cross beam 210. In some embodiments, two vertical beams may also be mounted perpendicularly below the first cross beam 210, i.e. mounted to the lower plane of the first cross beam 210.

The second cross beam 220 is below the first cross beam 210 and connects the at least two vertical beams. The length of the second cross beam 220 may be exactly equal to the length between the first vertical beam 230 and the second vertical beam 240, with the second cross beam 220 abutting the inner walls of the two vertical beams. The length of the second cross beam 220 may also be greater than the length between the two vertical beams, in which case the second cross beam 220 may exceed a certain distance of the vertical beams on two sides, the second cross beam 220 being mounted to the front plane or rear plane of the two vertical beams.

The first cross beam 210 is configured to mount a first sensor, such as a first LiDAR sensor, the first LiDAR sensor being, for example, a single-line LiDAR sensor. The second cross beam 220 is configured to mount a second sensor, such as a second LiDAR sensor, the second LiDAR sensor being, for example, a multi-line LiDAR sensor. The sensor bracket 200 is a vehicle-mounted LiDAR mounting bracket. Of course, a person skilled in the art could also mount other sensors on two cross beams according to needs, such as mounting a sensor such as a camera, a millimeter wave radar, an IMU, etc. or mounting other types of lidars, etc. The present disclosure does not specifically define the type of the sensor mounted on each cross beam.

In some embodiments, each cross beam and each vertical beam has a T-shaped structure or a cross-shaped structure that is stable in structure. The two cross beams and two vertical beams may have a grid-shaped (jing-font) structure, a rectangle-shaped (kou-font) structure, a kai-font structure, etc. therebetween as long as the cross beams and the vertical beams are perpendicular. The present disclosure does not specifically limit the shape of the bracket.

In some embodiments, each vertical beam is provided with a first sliding groove 211 that is provided with a scale such that the second cross beam 220 is operable to slide up and down along the first sliding groove to adjust the height of the sensor on the second cross beam 220. It should be understood that "A is provided with B" means "B has A". Further, the first cross beam 210 may also is operable to slide up and down along the first sliding groove to adjust the height of the sensor on the second cross beam 220. Furthermore, the present disclosure can also set a third cross beam, a fourth cross beam, etc. as needed, and adjust the heights of the first cross beam 210 and the second cross beam 220 when a new cross beam is needed. This allows a new sensor (e. g. a new lidar) to be mounted on the new cross beam.

In other embodiments, at least one of the first cross beam 210 and the second cross beam 220 may be provided with a second sliding groove 221. The second sliding groove may also have a scale so that each vertical beam is operable to slide left and right along the second sliding groove, thereby adjusting the position of the two sensors. In addition, by adjusting the interval between the two vertical beams, for example, when expanding the interval of the two vertical beams, the space can be increased to mount a new sensor on the corresponding cross beam. For example, if some trailing angle detections require two sensors to be mounted in the same dimension, the interval between two vertical beams can be adjusted to be bigger to mount two sensors on the corresponding cross beam.

That is, in the present disclosure, by setting the cross beam and the vertical beam as a T-shaped structure, and forming a sliding groove on the cross beam and/or the vertical beam, the two lidars can be adjusted up and down, and left and right, or the interval between two vertical beams or two cross beams can be increased to increase the number of lidars and single-line radars. In this way, reflecting plates can be matched at different tasks according to each task requirement, so that the lidar can collect the point cloud on the reflecting plate.

It should be understood by those skilled in the art that the sliding groove is provided on a contact surface of the cross beam and the vertical beam. For example, if the rear planes of the two vertical beams are mounted on the front plane of the cross beam, the first sliding groove is provided on the rear plane of the corresponding vertical beam, and the second sliding groove is provided on the front plane of the corresponding cross beam, so as to realize the up, down, left and right sliding between the two. On the contrary, if the front plane of the two vertical beams is mounted at the rear plane of the cross beam, then the first sliding groove is arranged at the front plane of the corresponding vertical beam and the second sliding groove is arranged at the rear plane of the corresponding cross beam. If the upper planes of the two vertical beams are mounted at the lower plane of the first cross beam 210, the second sliding groove of the first cross beam 210 is arranged at the lower plane of the second plane. If the left end and right end of the second cross beam 220 abut the inner sides of the two vertical beams, respectively, the first sliding groove is arranged at the inner sides of the two vertical beams.

In some embodiments, multiple sensors (e.g. two LiDAR sensors) of the present disclosure may be mounted directly on the corresponding cross beam by arranging the mounting hole of the sensor directly on the two cross beams. In other embodiments, a fixing plate may be arranged on the cross beam to mount the sensor on the fixing plate. Accordingly, the sensor bracket 200 of the present disclosure may further comprise a first fixing plate 250 mounted on the first cross beam 210 and a second fixing plate 260 mounted on the second cross beam 220 to fix two sensors on the two fixing plates, respectively. Specifically, 250 on the first fixing plate is configured to fix the first LiDAR sensor and the second fixing plate is configured to fix the second LiDAR sensor. The laser emitted by the first LiDAR sensor and/or the second LiDAR sensor is reflected back by the reflecting plate mounted at the front portion of the trailer.

The first fixing plate 250 is located on the second side of the first cross beam 210 and between at least two vertical beams. The first fixing plate 250 has multiple mounting holes thereon to fix the first LiDAR sensor 270 (see FIG. 3). In some embodiments, the first fixing plate 250 has a planar structure, the upper plane of first fixing plate 250 faces (or fittingly mounted to) the lower plane of the first cross beam 210. In other embodiments, the first fixing plate 250 has an L-shaped structure with the first portion (such as the vertical plane) of the L-shaped structure fittingly mounted to the front plane of the first cross beam 210.

The second fixing plate 260 is located on the second side of the second cross beam 220 and between at least two vertical beams. The second fixing plate is configured to fix the second LiDAR sensor 280 (see FIG. 3). The second fixing plate 260 is vertically below the first fixing plate 250 so that the second LiDAR sensor 280 is vertically below the first LiDAR sensor 270 to facilitate the distance calculation of the center points. In some embodiments, the second fixing plate 260 has a planar structure, the upper plane of the planar structure faces (or being fittingly mounted to) the lower plane of the second cross beam 220.

In other embodiments, the second fixing plate 260 has an L-shaped structure, the first portion (such as the vertical plane) of the L-shaped structure is fittingly mounted to the second side (i.e. front plane) of the second cross beam 220, the second portion of the L-shaped structure has a horizontal plane with a semi-arc shape, and the second portion is provided with a mounting hole 261 and an arc-shaped mounting groove 262. The mounting hole 261 and mounting groove 262 match the shape of the multi-line LiDAR sensor, and in particular the curved mounting groove 262 matches the outer contour of the second LiDAR sensor 280 for mounting the multi-line LiDAR sensor.

In addition, the second portion of the first fixing plate 260 may be provided with a first accommodating cavity (not shown in the figure) matched with the first LiDAR sensor 270, so as to facilitate the placement of the first LiDAR sensor 270 on the first accommodating cavity and improve the mounting stability. The second portion of the second fixing plate 260 may also be provided with a second accommodating cavity (not shown in the figure) matched with the second LiDAR sensor 280 to facilitate placement of the second LiDAR sensor 280 on the second accommodating cavity and improve the mounting stability.

It should be understood that one skilled in the art can select the method for mounting two vertical structural members as desired. For example, the right-angle angle aluminum 290 can be configured to fix both between the vertical beam and the first cross beam 210 and between the vertical beam and the second cross beam 220, although it is not limited thereto. In addition, the sensor bracket 200 is made of a metal material, such as a mature aluminum alloy profile and an aluminum plate, which can be easily manufactured and updated.

FIG. 3 shows a schematic view of a sensor bracket 200 mounted with two LiDAR sensors. The one on the upper side is a single-line LiDAR sensor, and the one on the lower side is a multi-line LiDAR sensor. In some embodiments, the sensor bracket 200 further comprises a reflecting plate (not shown in the figure) mounted on the front portion of the trailer, the reflecting plate being configured to reflect the laser emitted by the first LiDAR sensor and/or the second lidar so that the LiDAR sensor receives the laser reflected by the reflecting plate. Using the scanning range of the two radars and the laser reflected by the reflecting plate, the detection of the trailing angle, as well as the detection of the vehicle position and the environment behind the vehicle when backing a vehicle can be performed. For example, the single-line LiDAR sensor is configured to calculate the trailing angle and the multi-line LiDAR sensor is configured to provide blind spot information.

In some embodiments, the reflecting plate may be mounted directly on the second frame cross beam on the front portion of the trailer or may be mounted on the second frame cross beam on the front portion of the trailer via a reflecting plate bracket. The reflecting plate bracket (not shown in the figure) may also be configured as cross beam and vertical beam configurations, and a third sliding groove may be provided on the cross beam and/or vertical beam of the reflecting plate bracket, so that the reflecting plate is operable to slide up, down, left, and right along the sliding groove to match the scanning ranges of different lidars. For example, the reflecting plate bracket may comprise two vertical beams mounted on the second frame cross beam, the two vertical beams having a sliding groove so that the reflecting plate is operable to slide up and down. Alternatively, the reflecting plate bracket may be two cross beams, may be one cross beam and one vertical beam structure (T-shaped or cross-shaped), or may be two cross beams and one vertical beam (I-shaped or tu-font), or two cross beams and two vertical beams. The specific structure of the reflecting plate bracket is not limited in the present disclosure.

In some embodiments, the sensor bracket 200 further comprises a shock absorbing member (not shown in the figure), such as an elastic member, mounted to the first side of the first cross beam 210 for providing a shock absorbing function between the first cross beam 210 and the first frame cross beam 330.

In some embodiments, the sensor bracket 200 also comprises a rotating member (not shown in the figure) that may be configured to adjust the angle of the first cross beam 210 on the first frame cross beam 330, and thus adjust the trailing angle and blind spot information detection angle according to the first side on the first cross beam 210.

In some embodiments, the sensor bracket 200 further comprises a weight reducing member (not shown in the figure), such as multiple weight reducing holes in the mounting bracket, for reducing the weight of the bracket and reducing the burden of the vehicle body.

Figure 4:
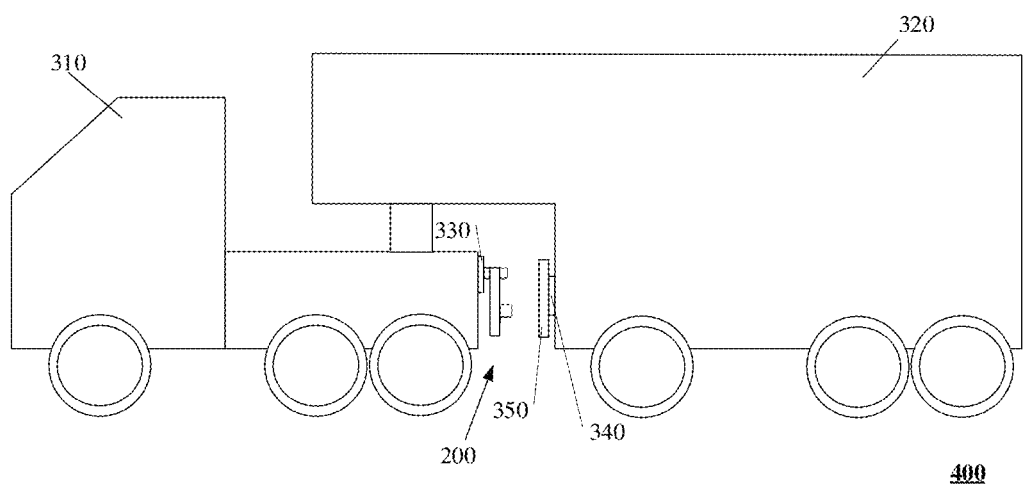
FIG. 4 is a schematic structural view of a vehicle 300 according to another embodiment of the present disclosure.

FIG. 4 shows a schematic view of a vehicle 300 according to another embodiment of the present disclosure. Referring to FIG. 4, in conjunction with FIGS. 2 and 3, the vehicle 300 comprises a tractor 310 and a trailer 320. The tail portion of the tractor 310 has a first frame cross beam 330 on which the sensor bracket 200 is mounted. The first LiDAR sensor 270 and the second LiDAR sensor 280 are mounted on the sensor bracket 200, and the first LiDAR sensor may be a single-line LiDAR sensor and the second LiDAR sensor may be a multi-line LiDAR sensor.

The specific structure of the sensor bracket 200 is as shown in FIGS. 2 and 3, comprising a first cross beam 210, a second cross beam 220, at least two vertical beams, a first fixing plate 250, and a second fixing plate 260.

The first side of the first cross beam 210 is mounted to the first frame cross beam 330.

The second cross beam 220 underlies the first cross beam 210 and connects the at least two vertical beams. In some embodiments, the first cross beam 210 and/or the second cross beam 220 are provided with a second sliding groove such that the vertical beam is operable to slide left and right along the second sliding groove.

The at least two vertical beams, for example, comprise a first vertical beam 230 and a second vertical beam 240. Of course, those skilled in the art can set other vertical beams as required, which is not limited in the present disclosure. The vertical beam of the present disclosure is perpendicularly mounted to the second side of the first cross beam 210, and each vertical beam is provided with a first sliding groove such that the first cross beam 210 and/or the second cross beam 220 is operable to slide up and down along the first sliding groove.

The first fixing plate 250 is located on the second side of the first cross beam 210 and between at least two vertical beams. In some embodiments, the first fixing plate 250 has a planar structure, the upper plane of the planar structure faces (or being fittingly mounted to) the lower plane of the first cross beam 210.

The second fixing plate 260 is located on the second side of the second cross beam 220 and between at least two vertical beams. In some embodiments, the second fixing plate 260 has an L-shaped structure, the first portion (such as the vertical plane) of the L-shaped structure faces the second side of the second cross beam 220, the second portion of the L-shaped structure has a horizontal plane with a semi-arc shape, and the second portion is provided with a mounting hole and an arc-shaped mounting groove.

In some embodiments, the vehicle 300 comprises a first sensor and a second sensor. The first sensor is mounted on the first cross beam 210, in particular on the first fixing plate 250 on the first cross beam 210, and the second sensor is mounted on the second cross beam 220, in particular on the second fixing plate 260 on the second cross beam 210. In some embodiments, a first LiDAR sensor 270 is mounted on the first fixing plate 250 and the second LiDAR sensor 280 is mounted on the second fixing plate 260.

In some embodiments, the vehicle 300 further comprises a reflecting plate 350 mounted to the front portion of the trailer 320, the front portion of the trailer 320 having a second frame cross beam 340 and the reflecting plate 350 being mounted to the second frame cross beam 340. Further, a reflecting plate bracket (not shown in the figure) may be firstly mounted on the second frame cross beam 340 to mount the reflecting plate 350 on the reflecting plate bracket. The reflecting plate bracket is of T-shaped, I-shaped, er-font, tu-font, rectangle-shaped (kou-font), and like structures. The third sliding groove is provided on the cross beam and/or vertical beam, so that the reflecting plate is operable to slide up, down, left, and right along the first sliding groove. The reflecting plate 350 is configured to reflect the laser emitted by the first LiDAR sensor 270 and/or the second LiDAR sensor 280. With the scanning range of the two radars and the laser reflected by the reflecting plate 350, the detection of the trailing angle, as well as the detection of the vehicle position and the environment behind the vehicle when backing a vehicle can be performed.

In some example embodiments, the reflecting plate 350 corresponds to the location of the first LiDAR sensor 270 and its height covers only the scanning height of the first LiDAR sensor 270, in which case the reflecting plate 350 reflects only the laser of the first LiDAR sensor 270 without affecting the laser emitted by the second LiDAR sensor 280. For example, in some embodiments, the single-line LiDAR sensor is configured to calculate the trailing angle and the multi-line LiDAR sensor is configured to supplement the blind spot information. Therefore, the reflecting plate 350 only reflects the laser of the first LiDAR sensor 270 and the laser of the second LiDAR sensor 280 can reach the outside of the vehicle.

In another example embodiment, the reflecting plate 350 corresponds to the location of the second LiDAR sensor 280, and its height covers only the scanning height of the second LiDAR sensor 280, in which case the reflecting plate 350 reflects only the laser of the second LiDAR sensor 280, without affecting the laser emitted by the first LiDAR sensor 270.

In yet another example embodiment, the reflecting plate 350 reflects the laser of two LiDAR sensors simultaneously, and then the reflecting plate 350 covers the scanning height of two LiDAR sensors.

The single-line LiDAR sensor and the multi-line LiDAR sensor of the present disclosure have an integrated structure, and its performance of the overall cooperation is stable. The solution is simple and firm in structure, easy to operate, easy to adjust, and easy to replace, thereby improving user experience. The mature hard aluminum alloy profile and aluminum plate are adopted in the structure, and the frame cross beam through-hole of the original vehicle is adopted at the mounting point, so the manufacturing cost is reduced and the manufacturing cycle is accelerated without changing the original vehicle structure. Furthermore, the present disclosure may adjust the cross beam position and vertical beam position of the sensor bracket, or the cross beam position and vertical beam position of the reflecting plate bracket to meet different detection requirements according to different task requirements.

It should be understood by those skilled in the art that the foregoing description is only illustrative of specific example embodiments of the present invention, and that the scope of the present invention is not limited thereto. It will be apparent to those skilled in the art that various modifications and variations can be made to the present application without departing from the spirit or scope of the application. Therefore, it is intended that the present application cover the modifications and variations of the present application provided they come within the scope of the appended claims and their equivalents of the present application.

We claim:

1. A sensor bracket, comprising:
a first cross beam, a first side thereof being mounted to a first frame cross beam of a tail portion of a tractor;
at least two vertical beams perpendicularly mounted to the first cross beam;
and a second cross beam located below the first cross beam and connecting the at least two vertical beams;
wherein each of the vertical beams has a first sliding groove and the second cross beam is operable to slide up and down along the first sliding groove;
wherein the first cross beam has a second side opposite to the first side and the sensor bracket further comprises:
a first fixing plate located at the second side of the first cross beam and between the at least two vertical beams,
and a second fixing plate located the second cross beam and between the at least two vertical beams;
wherein the first fixing plate is configured to fix a first LiDAR sensor and the second fixing plate is configured to fix a second LiDAR sensor;
wherein the first LiDAR sensor is a single-line LiDAR sensor and is configured to provide trailing angle information, the second lidar is a multi-line LiDAR sensor and is configured to provide blind spot information.

2. The sensor bracket of claim 1, wherein:
at least one of the first cross beam and second cross beam has a second sliding groove, each vertical beam is operable to slide left and right along the second sliding groove; and
both the first sliding groove and the second sliding groove have a scale.

3. The sensor bracket of claim 1, wherein
an upper plane of the first fixing plate faces a lower plane of the first cross beam.

4. The sensor bracket of claim 1, wherein
the second fixing plate has an L-shaped structure;
a first portion of the L-shaped structure is mounted to the second cross beam;
a second portion of the L-shaped structure has a horizontal plane with a semi-arc shape, and the second portion is provided with a mounting hole and an arc-shaped mounting groove.

5. The sensor bracket of claim 1, further comprises:
multiple weight reducing holes for reducing the weight of sensor the bracket.

6. A vehicle comprising
a tractor, a tail portion of the tractor having a first frame cross beam;
a trailer, and
a sensor bracket comprising:
   a first cross beam, mounted to the first frame cross beam at a first side of the first cross beam;
   at least two vertical beams perpendicularly mounted to the first cross beam;
   and a second cross beam located below the first cross beam and connecting the at least two vertical beams;
   wherein each of the vertical beams has a first sliding groove and the second cross beam is operable to slide up and down along the first sliding groove;
   wherein the first cross beam has a second side opposite to the first side and the sensor bracket further comprises:
      a first fixing plate located at the second side of the first cross beam and between the at least two vertical beams;
      and a second fixing plate located on the second cross beam and between the at least two vertical beams;
   wherein the vehicle further comprises a first lidar mounted to the first fixing plate and a second lidar mounted to the second fixing plate;
   wherein the first LiDAR sensor is a single-line LiDAR sensor and is configured to provide trailing angle information, the second lidar is a multi-line LiDAR sensor and is configured to provide blind spot information.

7. The vehicle of claim 6, wherein:
at least one of the first cross beam and the second cross beam has a second sliding groove, each vertical beam is operable to slide left and right along the second sliding groove; and
both the first sliding groove and the second sliding groove have a scale.

8. The vehicle of claim 7, further comprising:
and
a reflecting plate mounted to the trailer, the reflecting plate being configured to reflect a laser emitted by at least one of the first lidar and the second lidar.

9. The vehicle of claim 7, wherein an upper plane of the first fixing plate faces a lower plane of the first cross beam.

10. The vehicle of claim 7, wherein
the second fixing plate has an L-shaped structure;
a first portion of the L-shaped structure is mounted to the second cross beam and has a vertical plane;
a second portion of the L-shaped structure has a horizontal plane with a semi-arc shape, and the second portion is provided with a mounting hole and an arc-shaped mounting groove.

* * * * *